United States Patent Office 3,193,168
Patented July 6, 1965

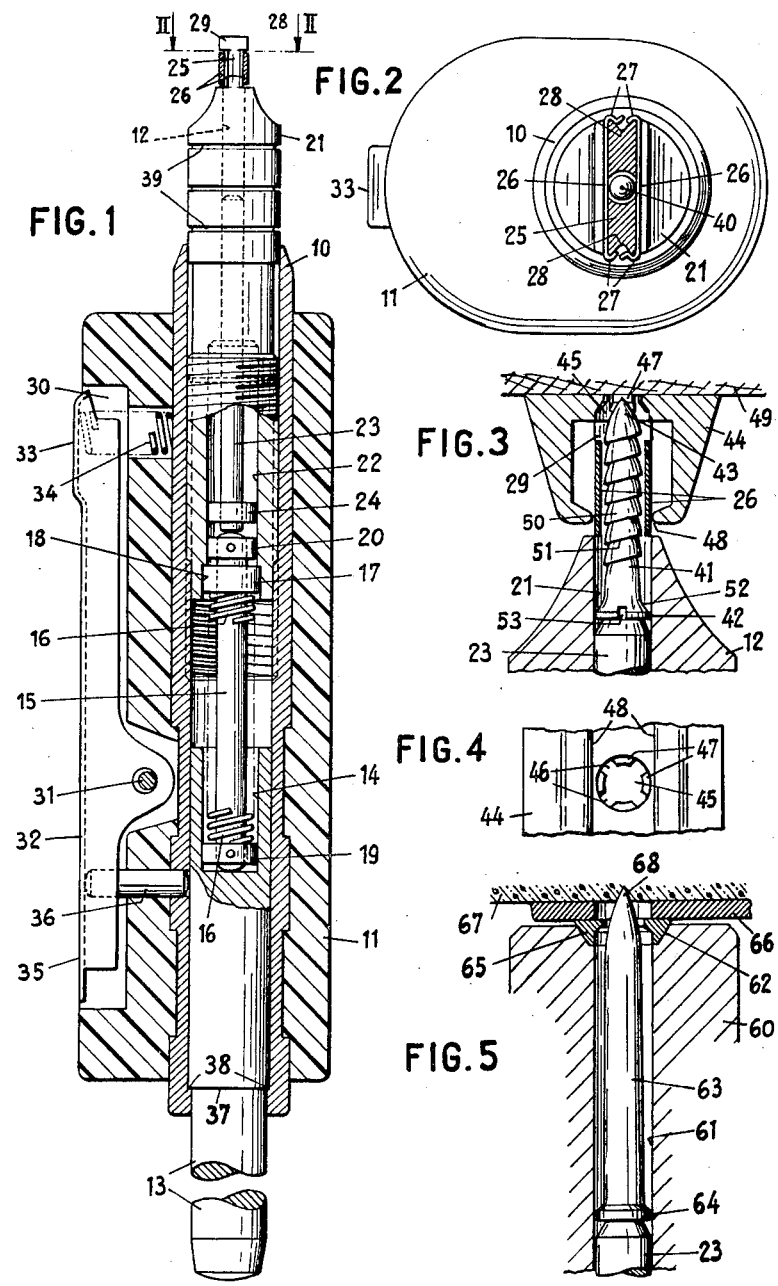

3,193,168
DEVICE FOR FIXING OBJECTS
Alexander Weber, Zollikofen, near Bern, Switzerland, assignor to Hans Beer, Bern, Bern, Switzerland, and Emma Weber-Horisberger, trading as AWEPA, Zollikofen, Switzerland
Filed Mar. 27, 1962, Ser. No. 182,826
Claims priority, application Switzerland, Oct. 27, 1961, 12,513/61
3 Claims. (Cl. 227—147)

The invention refers to a method of fixing objects such as curtain rails, moulding, nameplates and hooks onto a supporting body, by driving in pointed shank-shape fastening members of the like such as nails or screws, into the supporting body which may be provided with a hole at the fastening position, by means of a hand tool holding the impact member in position. The invention also relates to a hand tool and to devices for carrying out the method.

From experience is known that especially the mounting of hollow profiled curtain rails of considerable length by means of screws which must be screwed internally from underneath through the rail into a supporting structural element is rather difficult and time wasting. The screws and the screw driver must be inserted across the longitudinal rail slot which is defined by two parallel rail flanges having a highly polished surface for guiding curtain runners which would glide smoothly with a minimum of noise. The surface of these flanges is extremely vulnerable and often damaged by the screws of screw driver when the rail gets mounted.

The main object of the present invention is to simplify considerably the fitting of objects, in particular curtain rails, onto supporting structural parts of wood, shaped moulded material, stucco, concrete or the like thereby accelerating the method of fixing and avoiding injury to the rail slideways.

The present invention comprises a method of fixing objects, such as curtain rails, onto a supporting body by driving in pointed shank-shape impact members by means of a hand tool whereby the impact member to be driven in is held in readiness in a mouthpiece of the hand tool with the point barely projection therebeyond and is brought to bear with this point by means of the hand tool at the perforation spot of the object to be fixed, whereupon, due to impacts on the hand tool, the member being guided in the mouthpiece, at least approximately, in an axial direction is driven out of the mouthpiece across the object in the supporting body.

The invention from another aspect uses in said method a device comprising a sleeve one end of which has a hollow ejector mouthpiece for receiving the shank-shaped impact member to be driven home by a rivetting plunger for ejecting the member and movable in the sleeve under the action of a recoil spring, the plunger projecting out of the other end of the sleeve, a catch projecting through a lateral opening in the sleeve against the punch to permit the latter to advance but retaining the plunger after each forward movement against the action of the recoil spring and keeping it from running back until the catch is released.

A shank-shaped impact member which is particularly suitable for fixing an object on to a supporting body of wood or like deformable material, has a screw thread with a saw-tooth profile, the thread face directed toward the point being wider than the thread face turned towards the screw head in order that the screw may be forced into the resiliently deformable material of the supporting body and the wider threaded face thereby acting as a wedge, produces local resilient displacement of the material.

The object being fastened according to the invention may have a hole with radial areas extending from a central bore in star formation, the diameter of bore being less and the diameter of the periphery of the outer ends of the star greater than the shank diameter of the impact member and the wall projections of the hole between the areas of the star formation in the direction of entry of the member.

In order that the invention may be more clearly understood some embodiments in accordance therewith will now be described by way of example with reference to the accompanying drawing in which:

FIGURE 1 shows an axial section with parts in side elevation of a hand tool for use in carrying out the method of driving in a shank-shape impact member;

FIGURE 2 shows a cross-section along line II—II of FIGURE 1 on a larger scale looking in the direction of the arrows;

FIGURE 3 shows a curtain rail in cross section, located in the fixing position and the mouthpiece of the hand tool introduced into the rail in axial section, with an impact screw in position to be driven home;

FIGURE 4 shows part of the curtain rail from below in FIGURE 3 with a fixing hole; and FIGURE 5 shows a modification of the mouthpiece of the hand tool in axial cross-section with a striking peg or nail.

The hand tool is used upon the impact members for fastening the object to a supporting body which may already have a hole at the perforation spot. The tool has an elongated handle 11 surrounding a shank sleeve 10, preferably of synthetic plastic material and capable of being grasped comfortably by the operator's hand. A mouthpiece or head member 21 projects from one end of the sleeve 10 and is axially adjustable, being screwed into the sleeve 10. At the other end of the handle is a cylindrical rivetting plunger 13 which is disposed axially in the sleeve. This rivetting plunger 13 has on the inside a bore 14, in which a bolt 15 is located abutting axially against the rivetting plunger 13, while a coil spring 16, disposed round the bolt, is placed with one end on a ring 17 which is located in a bore 18 at the inner end of mouthpiece 12 and through which bolt 15 slidingly passes, the other end of the spring engaging a collar 19, fastened to the bolt. Another collar 20 is fixed to bolt 15 on the side of the ring 17 facing away from the spring.

A bore 12 in the mouthpiece 21 longitudinally coaxial with the bolt 15, is directed outwardly of the tool interior. This bore 12 merges inside the tool into a widened bore 22 in which the bolt 15, with its collar 20, and a sliding pin 23 with a ring 24 fastened in its inner end, are movable. The sliding pin 23 enters into the narrow bore 12 through which it can slide forwards up to and beyond the mouth of the bore 12.

The head member 21 has a narrow projection or free end portion 25 flattened on two sides, the parallel opposite side faces of which intersect the bore to form longitudinal slots which are each covered with a flat contiguous spring plate 26, the ends 27 of which engage at the narrow ends of the projection 25 in a V-shaped groove 28 (FIGURE 2). A shoulder type widening 29 on the free end of the projection 25 prevents any undesirable stripping of the plate springs 26, which serve to keep in position a nail 40 or the like in the bore 12 for the knocking-in operation.

In a hollow 30 of the handle 11 a two armed bolt lock and release lever 32 is disposed pivotable on a pin 31 and operated by pressure from outside the tool. One arm 33 of the lever is engaged by a coil spring 34 accommodated in the hollow 30, the other arm 35 of the lever engaging a catch pin 36, passing through the handle 11 and sleeve 10 but capable of being released by finger pressure on the lever arm 33 in order that the rivetting plunger reaches its starting position by the thrust of spring 16 on bolt 15 where it lies axially against a shoulder 37 on an inner shoulder 38 of the sleeve 10.

In use for driving in an impact screw 41 as in FIGURE 3 the screw is pushed with head 42 leading through the opening in the bore 12 of the mouthpiece 21 until the head engages the sliding pin 23, which is engaged against the bolt 15, the mouthpiece being screwed through the sleeve 10 to bring the sighting mark 39 appropriate to the length of the screw 41 (FIGURE 1) into position with respect to the end of the sleeve 10 whereby the pointed screw end 43 projects from the opening.

The object to be fastened, e.g. a hollow curtain rail 44 of aluminium (FIGURES 3 and 4), is provided with a bore 45 for the passage of a screw 41 at each of the fastening positions; wall projections 47 are formed by extending the bore 45 radially at 46, the projections 47 being countersunk in the direction of entry of the screw to form a seating for the head of the screw 42. The diameter of the bore 45 is smaller, and the diameter of the hole surrounding the arms 46 is greater than the outside diameter of the screw thread on the screw 41, so that the screw 41, on thrusting through the hole, pushes the wall projections 47 forwardly and is thus centrally guided as it is driven home through the bore 45.

After the tool is thus loaded for use the free end portion of its head member 12 is introduced through the rail slot 48 and placed on to the position of fixing, the point of the screw 43 projecting into the hole 45 of the rail 44. By imparting hammer blows on the end face of the projecting rivetting plunger 13 at the bottom of FIGURE 1, the screw is then driven progressively by means of the bolt 15 and the driving pin 23, axially out of the opening in the bore 12 through the bore 45 of the rails into the supporting body 49 of wood for example. The members 13, 15 and 23 form, therefore, driving means for driving a screw or the like resiliently held between leaf springs 26 into a bore in the rail to be fastened. The catch pin 36 holds the rivetting plunger 13 after each step forwards against the recoil of spring 16 in the set position thereby avoiding bouncing. After the screw has been fully driven home the lever arm 33 is pressed into the hollow 30 of the handle 11 and the catch pin 36 thereby released, so that the bolt 15 and the rivetting punch 13 are slid backwards under the action of the spring 16 into the starting position, while the sliding pin 23, by being restrained by plate springs 26, remains in the advanced position in the opening where it closes it and is thrust back to bolt 15 only when the following impact screw is introduced with the bore 12 of the tool.

With an impact screw 41 as in FIGURE 3 the diameter of the screw head 42 is only slightly greater than the shank diameter. The screw thread has a saw tooth longitudinal profile, of which the forward thread face 50 directed towards the point, is considerably wider than the thread face 51 directed towards the screw head. The wider thread face 50 is slightly convex. The inner threaded shaft widens gradually out at 52 out from the wider threaded face 50 of the screw pitch nearest to the screw head 42, with a concave curve up to the screw head. The screw point 43 is formed by the wider threaded flank and has the form of a projectile point.

When the screw is thrust into the wooden supporting body 49, its resiliently deformable material is displaced by the wider flank 50 of the thread in the manner of a wedge, without swarf breaking away therefrom. Due to the resilient compressibility of the wood fibres, they enter the screw thread so that a perfect screw joint is produced between the supporting body and the screw 41, which if necessary can be released by normal unscrewing of the screw, for which purpose the screw is provided on the head 42 with the usual slit 53.

The edgeless smooth portion 52 between the threaded shaft and the screw head 42, guarantees that this head will slip through smoothly between both plate springs 26 of the tool, whilst normal screws, the head of which could still be introduced through the rail slot, would have too fine and slender a thread to support it satisfactorily in the bore 12, and could easily assume an oblique position in the tool bore and thereby be put in askew.

In the modification showing in FIGURE 5 the mouthpiece 60 of the tool, the opening of the bore 61 forms an undercut widening out 62 in which a ring 65 is introduced, tapered on the outside, for forming a guide for the shank of an impact nail and then serving as a seating for the nail head 64 after the nail 63, or nail 41 as in FIGURE 3, has been inserted in the bore 61. This ring 65 remains after the nail or screw has been driven home onto the affixed object 66, for widening the support of the head 64. The mouthpiece 60 may be magnetised in order to prevent the nail or screw and also the ring 65 from falling out of the bore 61 and its undercut part 62 after being inserted therein.

Instead of an impact screw 41, a pointed striker peg or nail 63 as in FIGURE 5 of hardened steel, is used where there is a hard supporting body 67 not resiliently deformable, e.g. of concrete. This is knocked in by means of the tool for example for securing the curtain rail 41 as described with reference to FIGURE 3. The projecting point 68 of the pin 63 inserted in the mouthpiece 21 of the tool is centered by the wall projections 47 on entering the hole 45 and guided on being driven home these wall projections being capable of lateral compression in the gaps formed by the star arms 46 of the bore 45 corresponding to the thickness of shank of the striker peg 63 penetrating therein.

What I claim is:

1. A driving tool, especially for driving nails or the like through a slot of a hollow rail for fastening the latter to a support, comprising, in combination, elongated handle means formed with a first longitudinal bore therethrough; a head member carried by said handle means at one end thereof, said head member having a free end portion of a width considerably smaller than the remainder of said head member so as to be insertable into a slot of a rail, said head member being formed with a second bore therethrough axially aligned with said bore in said handle means and having a diameter greater than the width of said end portion so that said second bore intersects opposite side faces of said end portion and forms in said end portion a pair of opposite longitudinally extending slots; a pair of leaf springs carried by said end portion engaging said side faces and covering said slots so that a nail or the like having a head of a diameter substantially equal to that of said second bore may be resiliently held between said leaf springs; and driving means located in said axially aligned bores slidably guided therein and having a rear end projecting beyond the other end of said handle means and a front end adapted to engage a nail or the like resiliently held between said leaf springs.

2. A driving tool, especially for driving nails or the like through a slot of a hollow rail for fastening the latter to a support, comprising, in combination, elongated handle means formed with a first longitudinal bore therethrough; a head member carried by said handle means at one end thereof, said head member having a free end portion having a pair of parallel plane side faces spaced from each other a distance considerably smaller than the remainder of said head member so as to be insertable into a slot of a rail, said head member being formed with a second bore therethrough axially aligned with said bore in said handle means and having a diameter greater than said distance between said side faces so that said second bore intersects said side faces of said end portion and forms in said end portion a pair of opposite longitudinally extending slots; a pair of leaf springs carried by said end portion engaging said side faces and covering said slots so that a nail or the like having a head of a diameter substantially equal to that of said second bore may be resiliently held between said leaf springs; and driving means located in said axially aligned bores slidably guided therein and having a rear end projecting beyond the other end of said handle means and a front end adapted to engage a nail or the like resiliently held between said leaf springs.

3. A driving tool, especially for driving nails or the like through a slot of a hollow rail for fastening the latter to a support, comprising, in combination, elongated handle means formed with a first longitudinal bore therethrough; a head member carried by said handle means at one end thereof, said head member having a free end portion having a pair of parallel plane side faces spaced from each other a distance considerably smaller than the remainder of said head member so as to be insertable into a slot of a rail and a pair of opposite end faces extending transverse to said side faces and each formed with a longitudinally extending V-shaped groove, said head member being formed with a second bore therethrough axially aligned with said bore in said handle means and having a diameter greater than said distance between said side faces so that said second bore intersects said side faces of said end portion and forms in said end portion a pair of opposite longitudinally extending slots; a pair of leaf springs carried by said end portion engaging said side faces and covering said slots so that a nail or the like having a head of a diameter substantially equal to that of said second bore may be resiliently held between said leaf springs, said leaf springs having each a pair of opposite end portions extending at an angle to the remainder of the leaf spring and being resiliently engaged in said grooves, respectively; and driving means located in said axially aligned bores slidably guided therein and having a rear end projecting beyond the other end of said handle means and a front end adapted to engage a nail or the like resiliently held between said leaf springs.

References Cited by the Examiner

UNITED STATES PATENTS 1,222,129  4/17  Polkowski _____ 1—47
2,229,868  1/41  Newell _____ 1—47

FOREIGN PATENTS 1,217,057  12/59  France.

GRANVILLE Y. CUSTER, Jr., *Primary Examiner.*